United States Patent
Zou

(10) Patent No.: US 12,141,713 B2
(45) Date of Patent: *Nov. 12, 2024

(54) SYSTEMS AND METHODS FOR SEMANTIC ANALYSIS BASED ON KNOWLEDGE GRAPH

(71) Applicant: HITHINK FINANCIAL SERVICES INC., Chicago, IL (US)

(72) Inventor: Lu Zou, Hangzhou (CN)

(73) Assignee: HITHINK FINANCIAL SERVICES INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/174,641

(22) Filed: Feb. 26, 2023

(65) Prior Publication Data
US 2023/0222366 A1 Jul. 13, 2023

Related U.S. Application Data

(63) Continuation of application No. 16/330,083, filed as application No. PCT/CN2016/097943 on Sep. 2, 2016, now Pat. No. 11,593,671.

(51) Int. Cl.
*G06N 5/04* (2023.01)
*G06F 16/00* (2019.01)
(Continued)

(52) U.S. Cl.
CPC ............... *G06N 5/04* (2013.01); *G06F 16/00* (2019.01); *G06F 16/9024* (2019.01); *G06F 16/90335* (2019.01); *G06F 16/9536* (2019.01)

(58) Field of Classification Search
None
See application file for complete search history.

(56) References Cited

U.S. PATENT DOCUMENTS

| 8,032,480 B2 | 10/2011 | Pinckney et al. |
| 9,747,384 B1 | 8/2017 | Rao et al. |

(Continued)

FOREIGN PATENT DOCUMENTS

| CN | 102880985 A | 1/2013 |
| CN | 104021233 A | 9/2014 |

(Continued)

OTHER PUBLICATIONS

Ying, Josh Jia-Ching, Wang-Chien Lee, and Vincent S. Tseng. "Mining geographic-temporal-semantic patterns in trajectories for location prediction." ACM Transactions on Intelligent Systems and Technology (TIST) 5.1 (2014): 1-33. (Year: 2014).*

(Continued)

*Primary Examiner* — Uyen T Le
(74) *Attorney, Agent, or Firm* — METIS IP LLC

(57) ABSTRACT

The present disclosure relates to a method for semantic analysis performed by a computing device in the financial field. The method includes constructing a knowledge graph with a computer device. The method further includes obtaining, by the computer device, information published by the first user on a social network over the network. The method further includes the computer device generating standard information based on the information. The method further includes generating, by the computer device, a user behavior based on the standard information and the knowledge graph. The method further includes searching, by the computer device, for another user with similar user behavior based on the user behavior.

20 Claims, 13 Drawing Sheets

(51) Int. Cl.
*G06F 16/901* (2019.01)
*G06F 16/903* (2019.01)
*G06F 16/9536* (2019.01)

(56) References Cited

U.S. PATENT DOCUMENTS

| | | | |
|---|---|---|---|
| 10,025,862 B2 * | 7/2018 | Gramatica | G06F 16/9535 |
| 10,142,276 B2 | 11/2018 | Rapaport et al. | |
| 10,223,642 B1 * | 3/2019 | Felder | G06N 7/01 |
| 2009/0210713 A1 | 8/2009 | Ourega | |
| 2010/0268661 A1 | 10/2010 | Levy et al. | |
| 2011/0264665 A1 * | 10/2011 | Mital | G06F 16/9535 |
| | | | 707/769 |
| 2014/0297644 A1 | 10/2014 | Cheng | |
| 2015/0066594 A1 * | 3/2015 | Li | G06Q 30/0202 |
| | | | 705/7.31 |
| 2015/0262066 A1 | 9/2015 | Li et al. | |
| 2015/0294221 A1 | 10/2015 | Andres Gutierrez et al. | |
| 2015/0332405 A1 * | 11/2015 | Kachnowski | G06F 16/334 |
| | | | 705/36 R |
| 2016/0103932 A1 * | 4/2016 | Sathish | G06N 5/025 |
| | | | 715/767 |
| 2017/0140285 A1 | 5/2017 | Dotan-Cohen et al. | |
| 2018/0052842 A1 | 2/2018 | Hewavitharana et al. | |

FOREIGN PATENT DOCUMENTS

| | | | | |
|---|---|---|---|---|
| CN | 104240125 A | 12/2014 | | |
| CN | 104268171 A | 1/2015 | | |
| CN | 104462592 A | 3/2015 | | |
| CN | 105760439 A | 7/2016 | | |
| WO | 1998044444 A1 | 10/1998 | | |
| WO | WO-0125947 A1 * | 4/2001 | | G06F 16/9535 |
| WO | 2015006516 A2 | 1/2015 | | |
| WO | WO-2015188454 A1 * | 12/2015 | | G06F 17/30 |
| WO | WO-2016027172 A1 * | 2/2016 | | G06F 16/24578 |

OTHER PUBLICATIONS

International Search Report in PCT/CN2016/097943 mailed on May 31, 2017, 7 pages.
Written Opinion in PCT/CN2016/097943 mailed on May 31, 2017, 7 pages.
First Office Action in Chinese Application No. 201680084092.3 mailed on Mar. 18, 2021, 21 pages.
The Second Office Action in Chinese Application No. 201680084092.3 mailed on Sep. 22, 2021, 26 pages.
China Institute of Science and Technology Information, Methodological Exploration and Empirical Research of Patent Analysis, 2016, 16 pages.

* cited by examiner

SYSTEMS AND METHODS FOR SEMANTIC ANALYSIS BASED ON KNOWLEDGE GRAPH

CROSS-REFERENCE TO RELATED APPLICATIONS

This application is a Continuation of U.S. patent application Ser. No. 16/330,083, filed on Mar. 2, 2019, which is a U.S. national stage application under 35 U.S.C. § 1371 of International Application No. PCT/CN2016/097943, filed on Sep. 2, 2016, the contents of each of which are incorporated herein by reference.

TECHNICAL FIELD

The present disclosure relates to systems and methods for semantic analysis, in particular, to systems and methods for semantic analysis based on a knowledge graph in finance.

BACKGROUND

With the increasing popularity of the Internet, people are becoming more and more accustomed to publishing information on the Internet. With the increasing amount of information on the Internet, the credibility and accuracy of the information are becoming more and more uneven. More and more Internet companies want to evaluate the credibility of their users. For example, in some forums or blogs, some users' false information (including text, pictures, voice, video, etc.) often causes other users to blindly forward, which may harm the interests of others and generate a negative public opinion. The most common method of screening false information at present is to manually retrieve and filter customers' comments on the server, which is not only time-consuming and labour-intensive but also useless. Because only the contents of the false information and the single account publishing the statements are filtered, the user may continue to publish false statements by creating other accounts.

For example, in some web pages or forums that contain commodity transactions, sellers usually provide product information and their introductions. However, with the number of users increases, false product information and seller introductions make more and more customs be deceived. At present, the most common method is to manually screen and filter on the server side of the web pages or forums. However, this is not only time-consuming and labour-intensive, but also has the shortcomings such as incomplete acquisition of commodity information and large contingency of manual operation.

As another example, in some web pages or forums that contain user prediction information, such as football forums, stock forums, stock market evaluation pages, lottery forums, etc., users often have different prediction methods and prediction information. However, currently there is no system to evaluate the accuracy of the prediction based on a final real situation, and there is no system to mine user behavior hidden behind the information to associate or categorize users. That requires a system that can intelligently identify the prediction information published by users.

SUMMARY

In accordance with some embodiments of the present disclosure, a method for semantic analysis performed by a computing device in finance is provided. The method may include constructing a knowledge graph by the computer device. The method may further include obtaining, by the computer device, information published by the first user on a social network through a network. The method may further include generating, by the computer device, standard information based on the information. The method may further include generating, by the computer device, a user behavior based on the standard information and the knowledge graph. The method may further include searching, by the computer device, for another user with similar user behavior based on the user behavior.

In some embodiments, in the method, the information published by the first user on a social network may include prediction information.

In some embodiments, the method may further include establishing an association between the first user and another user by the computer device.

In some embodiments, in the method, the association between the first user and another user may be established on the social network.

In some embodiments, the method may further comprise accepting, by the computer device, an input for searching for another user from the first user.

In some embodiments, in the method, the input of the first user relating to searching for another user may further include one or more filter conditions set by the first user through the computer device.

In some embodiments, the method may further include verifying, by the computer device, the correctness of the information published by the first user on a social network.

In some embodiments, in the method, verifying the correctness of the information published by the first user on a social network may further include comparing, by the computer device, the information with one or more pieces of confirmed information.

In some embodiments, the method may further include grading, by the computer device, the first user based on the correctness of the information.

According to some embodiments of the present disclosure, a semantic analysis system in finance may be provided. The system may include a processor and a computer readable storage medium storing a set of instructions. When executed by a processor, the set of instructions cause the processor to build a knowledge graph. The instructions may further direct the processor to obtain the information published by the first user on the social network over the network. The instructions may further direct the processor to generate standard information based on the information. The instructions may further direct the processor to generate a user behavior based on the standard information and the knowledge graph. The instructions may further direct the processor to searching for another user with similar user behavior based on the user behavior.

In some embodiments, in the method, the information published by the first user on a social network may include prediction information.

In some embodiments, in the system, the processor may be configured to associate the first user with another user.

In some embodiments, in the system, the processor may be configured to associate the first user with another user on the social network.

In some embodiments, in the system, the processor may be configured to accept an input from the first user for searching for another user.

In some embodiments, in the system, the first user's input for searching for another user may further include one or more filter conditions set by the first user in the processor.

In some embodiments, in the system, the processor may be further configured to verify the correctness of the information posted by the first user on the social network.

In some embodiments, in the system, the processor may be further configured to compare the information posted by the first user on a social network with one or more pieces of confirmed information.

In some embodiments, in the system, the processor may be further configured to rate the first user based on the correctness of the information.

In some embodiments, in the system, the processor may be further configured to perform at least one operation including picture recognition, video recognition, voice recognition, text format processing, digital and unit normalization processing, and encrypted document decryption on the information published by the first user on the social network to generate the standard information.

BRIEF DESCRIPTION OF THE DRAWINGS

In order to illustrate the technical solutions related to the embodiments of the present disclosure, a brief introduction of the drawings referred to in the description of the embodiments is provided below. Drawings described below are only some examples or embodiments of the present disclosure. Those having ordinary skills in the art, without further creative efforts, may apply the present disclosure to other similar scenarios according to these drawings. Unless stated otherwise or evident from the context, the same reference numeral in the drawings refers to the same structure and operation.

DETAILED DESCRIPTION

Figure 1:
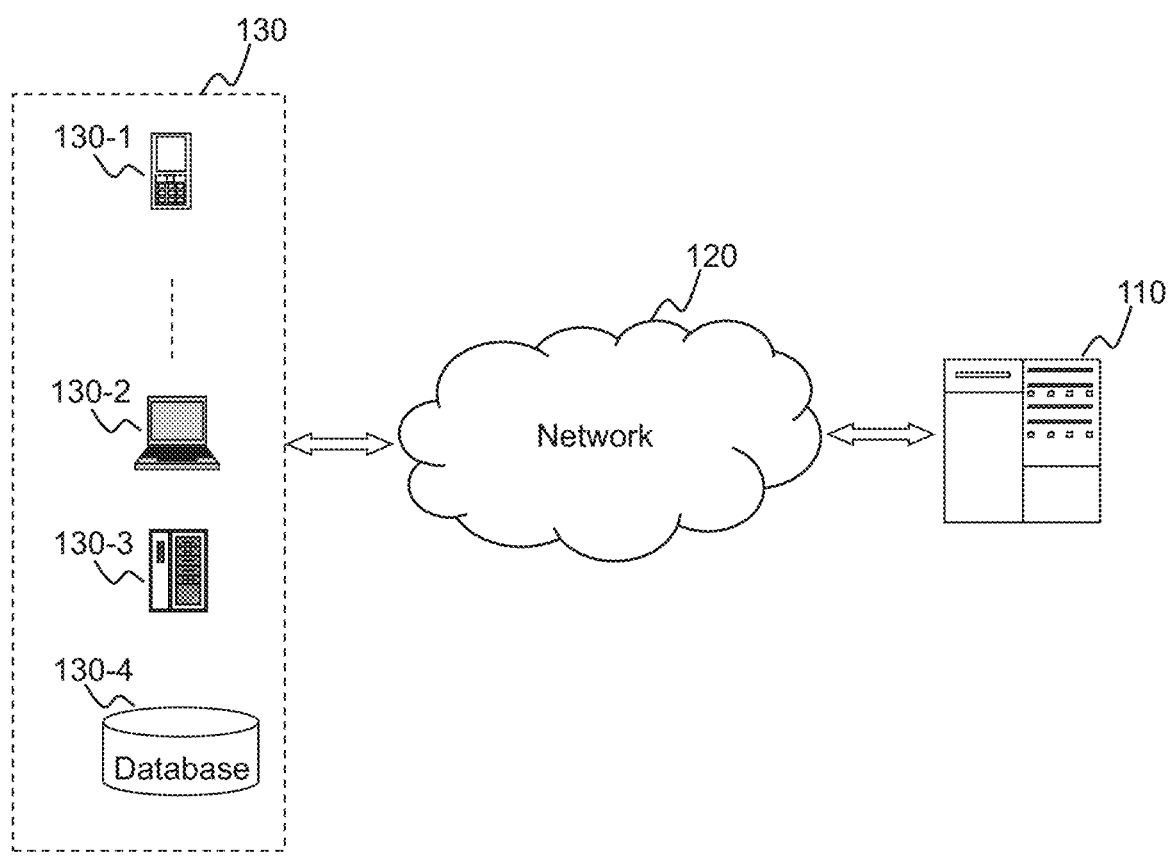
FIG. 1 is a schematic diagram of an exemplary system configuration of a semantic analysis system.

As used in the disclosure and the appended claims, the singular forms "a," "an," and "the" include plural referents unless the content dictates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

"Meaning" refers to the meaning contained in a message that humans may understand. "Semantic" refers to the meaning of the information itself and does not contain human understanding. Unless the context indicates the exception, the context of the "meaning" also includes "semantic."

Some modules of the system may be referred to in various ways according to some embodiments of the present disclosure. However, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flowcharts are used to illustrate the operations performed by the system. It is to be expressly understood, the operations above or below may or may not be implemented in order. Conversely, the operations may be performed in inverted order, or simultaneously. Moreover, one or more operations may be added to the flowcharts. One or more operation may also be removed from the flowcharts.

The semantic analysis method described in the present disclosure refers to generating analysis results by collecting information, processing information, recognizing information semantically, evaluating and comparing the recognized information. In some embodiments, the present disclosure relates to a semantic analysis system. The semantic analysis system may include a collection module, a system storage module, a processing module, a semantic recognition module, an evaluation module, a comparison module, and an output module. Another aspect of the present disclosure relates to a semantic recognition method based on a knowledge graph. The semantic analysis method may include collecting the information, identifying the semantic vector in the information, constructing the semantic vector library, constructing the knowledge graph, mapping the semantic vector to the knowledge graph, generating a semantic recognition result according to the knowledge graph and the relationships of the semantic vectors, etc. Another aspect of the disclosure relates to evaluating the correctness of information and grading the information and the associated users based on the semantic recognition information. Another aspect of the disclosure relates to generating the relationships between user behaviors and grades by analyzing user behaviors, classifying the users according to the behaviors, and counting the relevance and grades of the similar users.

The present disclosure relates to a system that may intelligently identify information on a server or web page. The system may identify the false information, associate the false information with the corresponding user who published the information and finds similar or identical users according to the associations among the information (or among multiple accounts of one user).

The present disclosure relates to a system that may intelligently identify server-side or transaction web page information. The system may identify a content, and determine and search for a website with high authority or credibility related to the content, thereby identifying false information or data.

The present disclosure relates to a system that may intelligently determine the accuracy of prediction based on actual results that occur later. The system may also identify deep content points (e.g., different users' prediction strategies, investment ways, etc.) by analyzing the prediction information, thereby associating or classifying users with similar characteristics. With the popularity of social networks and the miniaturisation of network hardware devices, the system may also meet the needs of users to use network hardware devices to communicate with users with similar characteristics.

Different embodiments of the disclosure are applicable to a variety of fields including, but not limited to, investments in finance and derivatives (including but not limited to stocks, bonds, gold, paper gold, silver, foreign exchange, precious metals, futures, money funds, etc.), technology (including but not limited to mathematics, physics, chemistry and chemical engineering, biology and bioengineering, electronic engineering, communication systems, Internet, Internet of things, etc.), politics (including but not limited to politicians, political events, countries), news (in the aspect of the regional perspective, including but not limited to regional news, domestic news, international news; in the aspect of the body of the news, including but not limited to political news, sports news, technology news, economic news, life news, weather news, etc.). According to at least one embodiment of the present disclosure, semantic information in various information resources, such as text, pictures, audio, and video content, may be quickly collected and processed, and semantic recognition may be performed according to the knowledge graph. The identified information and a semantic analysis result are generated by evaluating and comparing the information after semantic recognition, which may correlate users with similar user behaviors. The application scenarios of different embodiments of the present disclosure may include but not limited to one or more web pages, browser plugins and extensions, client terminals, custom-built systems, intracompany analysis systems, artificial intelligence robots, or the like, or any combination thereof. The description above about the fields is provided for illustration purposes, and should not be considered as the only practical embodiment. Obviously, for persons having ordinary skills in the art, the fields of the above methods and systems may be modified or altered in forms and details under the teaching of the fundamental principle of the methods and systems for semantic analysis. However, those modifications and alterations are within the scope of the above description. For example, in one embodiment of the present disclosure, the semantic analysis results may be displayed to users in a unified text form. For those skilled in the art, the semantic analysis results may also be displayed in a unified audio format or video format. Alternatives or modifications or variations similar to this are still within the scope of the disclosure.

FIG. 1 is a schematic diagram of an exemplary system configuration of a semantic analysis system. The exemplary system configuration 100 may include, but is not limited to, one or more semantic analysis systems 110, one or more networks 120, and one or more information sources 130. The semantic analysis system 110 may be a system for semantic analysis by collecting information to generate an analysis result. The semantic analysis system 110 may be a server or a server group. The server group may be centralized, for example, a data centre. The server group may be distributed, e.g., a distributed system. The semantic analysis system 110 may be local or remote. The network 120 may provide a channel for information exchange.

The network 120 may be a single network or a combination of networks. For example, the network 105 may include a local area network (LAN), a wide area network (WAN), a public network, a private network, a proprietary network, a wireless local network, a virtual network, a metropolitan area network, a public switched telephone network (PSTN), or the like, or any combination thereof. The network 120 may include multiple network access points, such as a wired access point, a wireless access point, a base station, or a network switching point. Through the network access points, a data source may be connected to the network 120 and information may be transmitted via the network 105. The information source 130 may provide a variety of information.

The information source 130 may include one or more servers, one or more communication terminals, or a combination thereof. Further, the server may include a web server, a file server, a database server, an FTP server, an application server, a proxy server, or the like, or any combination thereof. The above server may be a server based on one or more social media. The communication terminal may include a phone, a personal computer, a wearable device, a tablet computer, a smart television, or the like, or any combination thereof. The communication terminal may also be other electronic devices with communication functions and user interaction functions. The information source 130 may transmit information and data to the semantic analysis system 110 via the network 120. The information source 130 may include information input by users, or information provided by other databases or information sources. The semantic analysis system 110 may send the semantic analysis result to the information source 130 via the network 120.

Figure 2:
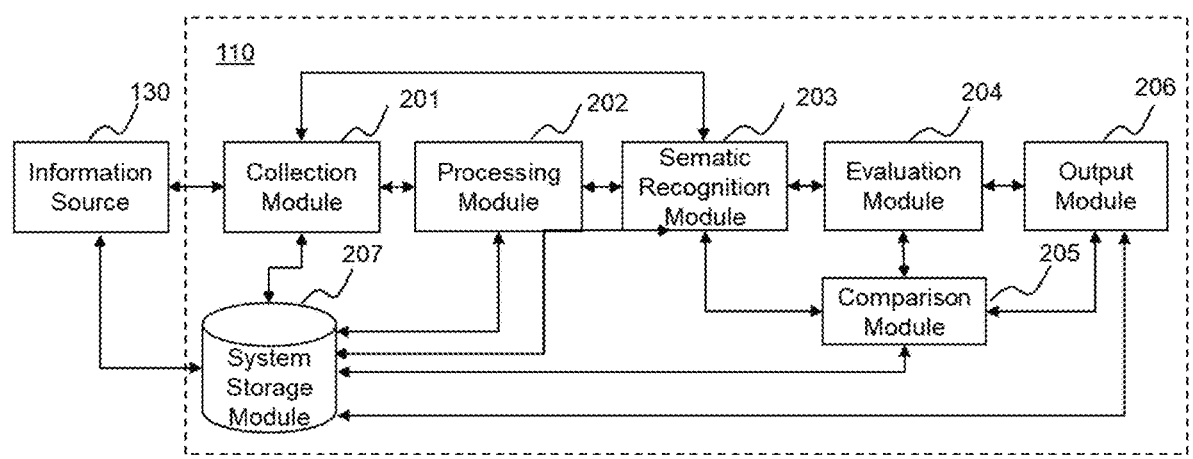
FIG. 2 is a schematic block diagram of an exemplary semantic analysis system.

FIG. 2 is a schematic block diagram of an exemplary semantic analysis system 110. The semantic analysis system 110 may include, but is not limited to, one or more collection modules 201, one or more processing modules 202, one or more semantic recognition modules 203, one or more evaluation modules 204, one or more comparison modules 205, one or more output modules 206, and one or more system storage modules 207. Part or all of the modules mentioned above may be connected to the network 120 shown in FIG. 1. The modules mentioned above may be centralized or distributed. One or more of the modules mentioned above may be local or remote.

The term "module" in the present disclosure may refer to logic or a set of software instructions stored in hardware or firmware. The "module" referred to here may be executed by software and/or hardware modules or stored in any computer-readable, non-temporary media or other storage devices. In some embodiments, a software module may be compiled and connected to an executable program. The software module here may respond to information transmitted by itself or other modules and/or may respond when specific events are detected or interrupted. A software module set to be capable of operating on a computing device (e.g., the processor 210) may be provided on a computer readable medium (e.g., the storage 220), and the computer readable medium here may be a disk, a digital disk, a flash disk, a magnetic disk, or any other kind of tangible medium. A software module may also be obtained through a digital download manner (the digital download here may also include data stored in a compressed package or an installation package, which needs to be decompressed or decoded before execution). The software code here may be partly or wholly stored in a storage device of the computing device executing the operation and be applied to the operation of the computing device. Software instructions may be embedded in firmware, such as an erasable programmable read only memory (EPROM). It will be further appreciated that hardware modules may be include connected logic components, such as gates, triggers, and/or programmable units, such as programmable gate arrays or processors. The functions of the modules or computing devices described here are preferably implemented as software modules, but may also be represented in hardware or firmware. In general, the module referred here is a logic module and not limited by a specific physical form or memory constraints. A module may be combined with other modules or separated into a series of sub-modules.

The collection module 201 may be mainly used to collect required information or data in various ways. The way to collect information may be direct (for example, directly acquiring information from one or more information sources 130 through the network 120), or may be indirect (for example, acquiring information by the processing module 202 or the system storage module 207).

The processing module 202 may be mainly used for pre-processing information or data. The pre-processing of the information may be partially or entirely performed by users or may be partially or entirely performed by the processing module 202. The pre-processing of information may include but is not limited to picture recognition, video recognition, speech recognition, text format processing, digital and unit normalization processing, encrypted document decryption, or any combination thereof. The processing module 202 may perform one or more of the above pre-processing operations to the information to convert the information into a similar format (standard information).

The semantic recognition module 203 may be mainly used to recognize semantic in the information processed by the processing module 202 and construct or update the knowledge graph according to the recognized semantic information. The way in which the semantic recognition module 203 recognizes the semantic in the information may be wholly or partially completed by the user or may be wholly or partially performed by the semantic recognition module 203.

The evaluation module 204 may be mainly used to evaluate the semantic information recognized by the semantic recognition module 203. The evaluation may include but is not limited to, comparing the semantic information with a related content to determine the correctness of the semantic information. The related content may be acquired from one or more information sources 130 through the network 120, be acquired by the system storage module 207, or may be acquired from an external information source by establishing a network connection between one or more evaluation modules 204 and the external information source (not shown in FIG. 2).

The comparison module 205 may be used to compare the semantic information recognized by the semantic recognition module 203 with the semantic information itself or other content. For example, the comparison may include comparing a plurality of pieces of semantic information with each other and may also include comparing one or more pieces of semantic information with information including a related content. The comparison may also include matching semantic information to users. Further, the comparison module 205 may associate a plurality of users according to the results that the plurality of pieces of semantic information are compared with each other and/or the results that the semantic information matches the users.

In some embodiments of the present disclosure, the comparison module 205 may bidirectionally communicate with the semantic recognition module 203. The information may be compared in the comparison module 205 after being recognized in the semantic recognition module 203. In some embodiments of the present disclosure, the comparison module 205 may also obtain an evaluation result from the evaluation module 204. The comparison module 205 may generate a comparison result after the evaluation result or the information after semantic recognition is compared. The comparison result may be output by the output module 206, may also be evaluated by the evaluation module 205, or may be stored in the system storage module 207.

The output module 206 may be used to integrate or summarise the evaluation and comparison results generated by the evaluation module 204 and the comparison module 205. The output module 206 may store the integrated or summarised results in the system storage module 207, output the results to the information source 130 shown in FIG. 1, or may connect the output module 206 with other devices or interfaces (not labelled in FIG. 2) of the semantic analysis system 110 to output the results to the other devices or interfaces.

The system storage module 207 may generally refer to a device or portion having a storage function. The system storage module 207 may be configured to store data collected from the information source 130 and various data generated during the operation of the semantic analysis system 110. The system storage module 207 may be local or remote. The connection or communication between the system storage module 207 and semantic analysis 110 other modules in the system may be wired or wireless.

Obviously, to those skilled in the art, after understanding the basic principles of the information analysis system and method, the form and details (e.g., the combination of individual modules, the connection between a sub-system and modules) may be modified or varied without departing from the principles. The modifications and variations are still within the scope of the current disclosure described above. For example, the modules may be different modules in a system or a single module may be capable of achieving the functions of two or more modules. For example, in some embodiments of the present disclosure, the evaluation module 204 and the comparison module 205 may be combined into one evaluation comparison module. In some embodiments of the present disclosure, the evaluation module 204 may be included in the semantic recognition module 203, and the comparison module 205 may also be included in the semantic recognition module 203. In some embodiments of the present disclosure, the evaluation module 204, the semantic recognition module 203, and the comparison module 205 may be combined into one module.

Figure 3:
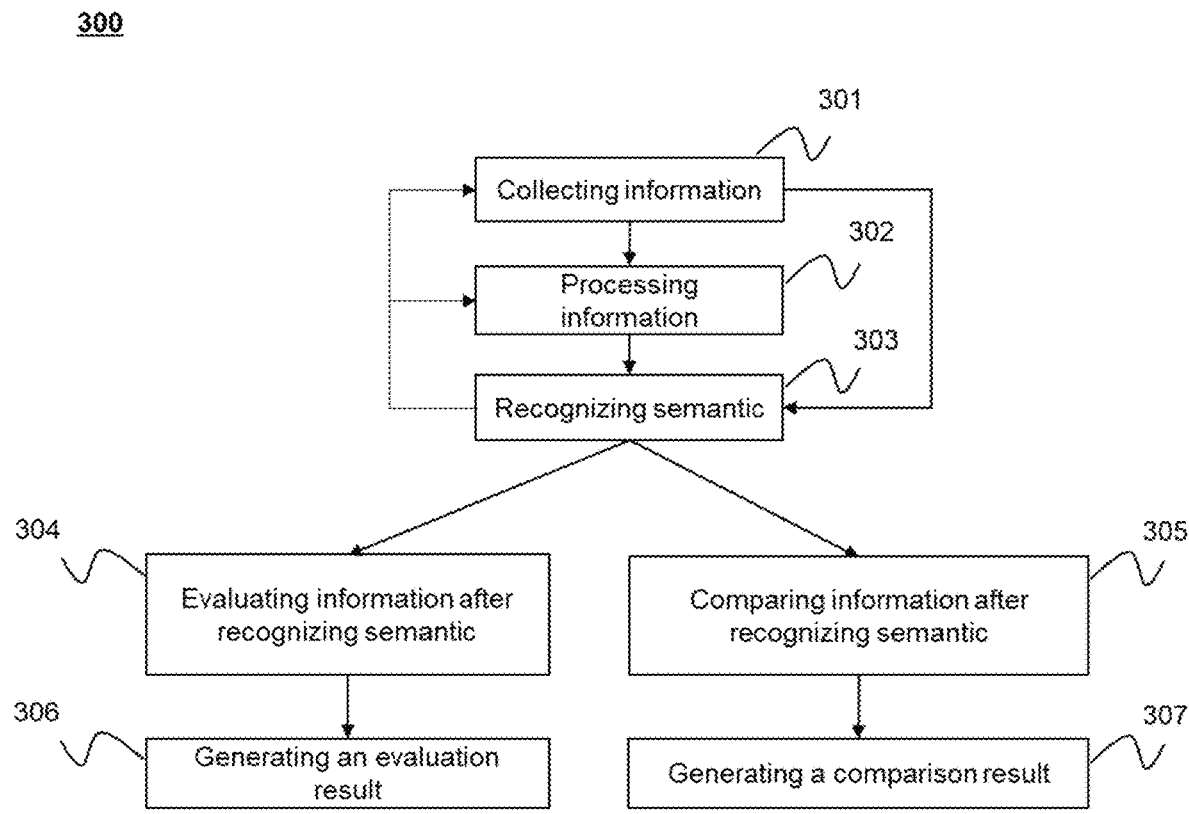
FIG. 3 is a flowchart of an exemplary process for semantic analysis.

FIG. 3 is a flowchart of an exemplary process 300 for semantic analysis. The required information may be collected in step 301. In some embodiments of the present disclosure, information and data may be obtained from the information source 130. The information source 130 may include a server or a communication terminal. Further, the server may include a web server, a file server, a database server, an FTP server, an application server, a proxy server, or the like, or any combination thereof. The above server may be a server based on one or more social media. The communication terminal may include a phone, a personal computer, a wearable device, a tablet computer, a smart television, or the like, or any combination thereof. The communication terminal may also be other electronic devices with communication functions and user interaction functions. Further, in step 301, the original information input by the user through various communication terminals may be received. The above-required information may include but is not limited to, various news, announcements, comments, research reports, blogs, messages, reports, notices, essays, journals, or the like, or any combination thereof. The above-required information may be information and/or data about various industries, including but not limited to sports, entertainment, economics, finance, stocks, securities, politics, military, culture, art, science, engineering, or the like, or any combination thereof. The form of information required above may include, but is not limited to, text, pictures, data, files, audio, video, or the like, or any combination thereof. Step 301 may be completed by the collection module 201.

In some embodiments of the disclosure, the collection module 201 may collect information from the information source 130 and transmit the collected information to the processing module 202. The collection module 201 may also transmit the collected information to the system storage module 207. In a particular case (e.g., the collected information has been pre-processed or rendered in advance), the collection module 201 may also transmit the collected information directly to the semantic recognition module 203 without being processed by the processing module 202. The collecting module 201 may receive the request sent by the processing module 202, and may also access the system storage module 207 or the information source 130 according to the request to obtain the required data. After acquiring the required data, the collection module 201 may transmit the data to the processing module 202. The collecting module 201 may receive the request sent by the semantic recognition module 203, and may also access the system storage module 207 or the information source 130 according to the request to obtain the required data. After acquiring the required data, the collection module 201 may transmit the data to the semantic recognition module 203.

The collection module 201 may be used primarily to collect the required information in a variety of ways. The collection module 201 may obtain the required information by sending a request to the information source 130. After the collection module 201 obtaining the required information, the obtained information may be processed in the next step or stored in the system storage module 207. The collection module 201 may also obtain the information stored in the system storage module 207 by sending a request to the system storage module 207. Alternatively, the system storage module 207 may send a request to the information source 130 to obtain information and the information obtained may be stored in the system storage module 207.

The information collected in step 301 may be processed in step 302. Step 302 may be performed by the processing module 202. The processing information performed by step 302 may include but is not limited to picture recognition, video recognition, speech recognition, text format processing, digital and unit normalization processing, encrypted document decryption, or any combination of that. Step 302 may include performing one or more of the above information processing operations on the information to convert the information into standard information. In some embodiments of the present disclosure, the information collected in step 301 may be textual information. The textual information may be derived directly or indirectly from text, pictures, audio, video, or any combination thereof. Further, when the textual information is derived from a picture, the semantic analysis system 110 may convert the picture into text by picture recognition (e.g., optical character recognition OCR). When the textual information is derived from an audio, the semantic analysis system 110 may convert the audio to text by speech recognition or subtitle extraction. When the textual information is derived from a video, the semantic analysis system 110 may convert the video to text by speech recognition or subtitle extraction. The text information may be Chinese, English, German, Spanish, Arabic, French, Japanese, Korean, Russian, Portuguese, or the like, or any combination thereof. In some embodiments of the present disclosure, the semantic analysis system 110 may determine one or more languages or a language combination included in the textual information to correctly represent the content of the textual information. The determination process may be completed in part or whole by the user or may be performed in part or whole by the semantic analysis system 110. Further, the text information may include a letter, a number, a character, a word, a phrase, a sentence, a paragraph, a chapter, or the like, or any combination thereof, or a set of any number of identifiers. The set of identifiers may include one or more semantics. In some embodiments of the present disclosure, raw data and/or metadata successfully converted to text may be stored in the system storage module 207 or transmitted to the information source 130, or may be deleted/covered.

In some embodiments of the present disclosure, textual information from different sources may be formatted after being transformed into text. Text formatting may convert text to a regular text format. The unified text format may include but is not limited to txt, ASCII, MIME, or the like, or any combination thereof. After text formatting, the system may normalize the numbers and units in the processed text. For example, convert "30 thousands yuan" to "30,000 yuan", convert "35 dozen" to "420" and so on.

In some embodiments of the present disclosure, the processing module 202 may communicate bidirectionally with the collection module 201. The processing module 202 may process the information transmitted from the collection module 201. The information processing may include, but is not limited to picture recognition, video recognition, voice recognition, text format processing, digital and unit normalization processing, and encrypted document decryption, or the like, or any combination thereof. The processing module 202 may also send information to the collection module 201. The sent information may include but is not limited to the processed information and control information. The control information may include but is not limited to information to control the information collection manner, information to control the information collection time, information to control the source of information collection. The processing module 202 may communicate bidirectionally with the semantic recognition module 203. The processing module 202 may transmit the processed information to the semantic recognition module 203 or may receive the information sent by the semantic recognition module 203. The processing module 202 may communicate bidirectionally with the system storage module 207. The processing module 202 may transmit the processed information to the system storage module 207 for storage or may send a request to the system storage module 207 and receive the information sent by the system storage module 207 during processing.

After the information is processed in step 302, it may be semantically recognized in step 303. Step 303 may be performed by the semantic recognition module 203. Step 303 may include splitting the information processed in step 302 into one or more semantic fields. For example, "The index will rise more than 2% on Wednesday" may be split into multiple semantic fields such as "Wednesday", "Index", "Rise", "Exceed", "2%". The semantic fields may be mapped into a knowledge graph. The knowledge graph may recognize the semantic fields according to the association among the semantic fields and generate a recognized result.

In some embodiments of the present disclosure, the information collected in step 301 may be processed in advance as described in step 302 or appear in a same form with that after being processed. In this case, the information may be semantically recognized directly in step 303 after being collected in step 301. In some embodiments of the present disclosure, step 303 may include detecting if the association among the semantic fields is sufficient (e.g., whether the semantic fields are sufficiently identified, etc.). Further, if the association among the semantic fields is insufficient, the semantic analysis system 110 may repeat step 301 to collect more information and repeat step 302 to process the information (newly obtained information and/or the information that has been processed) further, which may improve the association among the semantic fields. The step(s) 301 and/or 302 may be repeated until the semantic analysis system 110 detects that the association among the semantic fields is sufficient to identify the semantic fields. In some embodiments of the present disclosure, after repeating steps 301 and 302 for a certain number of times, the semantic analysis system 110 may perform step 304. In some embodiments of the present disclosure, step 303 may also include detecting whether the information processed in step 302 or the information directly collected in step 301 satisfies the condition required in step 303 (e.g., whether the text format is correct or not, whether numbers and units are normalized or not). Further, if the collected information does not satisfy the condition required in step 303, the semantic analysis system 110 may repeat step 302 to process the collected information further until the information satisfies the condition required in step 303.

In some embodiments of the present disclosure, the semantic recognition module 203 may send a request to the collection module 201, and the collection module 201 may access the system storage module 207 or from one or more information sources 130 according to the request to obtain the required information. After the required information is obtained, the collection module 201 may transmit the information to the processing module 202. The processing module 202 may transmit the information to the semantic recognition module 203 after processing the information. Alternatively, after receiving the request sent from the semantic recognition module 203, the collection module 201 may also directly transmit the information from the collection module 201 to the semantic recognition module 203. The information may be from the information source 130 or the system storage module 207. Alternatively, the semantic recognition module 203 may directly access the system storage module 207 and send a request to the system storage module 207 to obtain the required information. The required information may be transmitted to the semantic recognition module 203. Alternatively, the system storage module 207 may send information to the semantic recognition module 203 without receiving a request.

The semantic recognition module 203 may semantically recognize the received information. Further, the semantic recognition module 203 may transmit the information after semantic recognition to the evaluation module 204, transmit the information after semantic recognition to the comparison module 205, or store the information after semantic recognition in the system storage module 207.

After the message is semantically recognized in step 303, it may be evaluated in step 304. Step 304 may be performed by the evaluation module 204. Step 304 may include comparing the semantic information recognized in step 303 with the related content to determine the correctness of the semantic information. The related content may be directly obtained through a database, a webpage, a book, a forum, or the like, or may be obtained from the channels mentioned above and stored in the system storage module 207, and then obtained from the system storage module 207. In some embodiments of the present disclosure, the related content may be information of higher credibility. For example, the message "A stock index rose on Apr. 5, 2016" may be compared with the relevant content "A stock index rose by 0.55% on Apr. 5, 2016" published by Stock Exchange A to determine the correctness of the above information, that is, the above information is correct. Further, step 304 may also include matching one or more pieces of information with one or more users, such that the evaluation module 204 may generate a matched user's credibility based on the correctness of the semantic information. After evaluating the information in step 304, the evaluation module 204 may generate an evaluation result in step 306. The evaluation result may include the correctness of the information, and may also include the credibility of the user. In some embodiments of the present disclosure, both the correctness and the credibility may be represented as a numerical value or a percentage. The semantic analysis system 110 may also compare different users' correctness or credibility values or percentages.

After the information is semantically recognized in step 303, it may also be compared in step 305. Step 305 may be performed by the comparison module 205. Step 305 may include comparing one or more semantic fields of a piece of semantic information or comparing a combination of two or more semantic fields of a piece of semantic information. Step 305 may also include comparing one or more similar semantic fields of a plurality of pieces of semantic information. Further, step 305 may include matching one or more pieces of semantic information to one or more users, such that the comparison module 205 may compare the plurality of users based on the matched semantic information. After comparing the information or users in step 305, the comparison module 205 may generate a comparison result in step 307. The comparison result may include a comparison result of the one or more pieces of information, and may also include a comparison result of the users. For example, the comparison result may be "User A invests mostly in short-term investment in the past year" and "User B's investment behavior has an 83% similarity with User A".

In some embodiments of the present disclosure, the semantic information obtained at step 303 may be compared at step 305 after being evaluated at step 304 (and/or step 306), and vice versa. Further, one or more pieces of semantic information may be matched to one or more users. After completing the evaluation and comparison steps for the semantic information, the semantic analysis system 110 may generate results related to the evaluation results and the comparison results based on steps 304 and 305. The results may include assessment results and comparison results of information, and may also include evaluation results and comparison results of matched users.

In some embodiments of the present disclosure, the evaluation module 204 may communicate bidirectionally with the semantic recognition module 203. The information may be evaluated in the evaluation module 204 after being recognized in the semantic recognition module 203. In some embodiments of the present disclosure, the evaluation module 204 may also obtain comparison results from the comparison module 205. The evaluation module 204 may generate an evaluation result after the information after semantic recognition or the comparison results are evaluated. The evaluation result may be outputted by the output module 206, may also be compared by the comparison module 205, or may be stored in the system storage module 207.

It should be noted that the above description of the process for the semantic analysis system is only to facilitate the understanding of the disclosure and should not be considered as the only possible embodiment of the disclosure.

Figure 4:
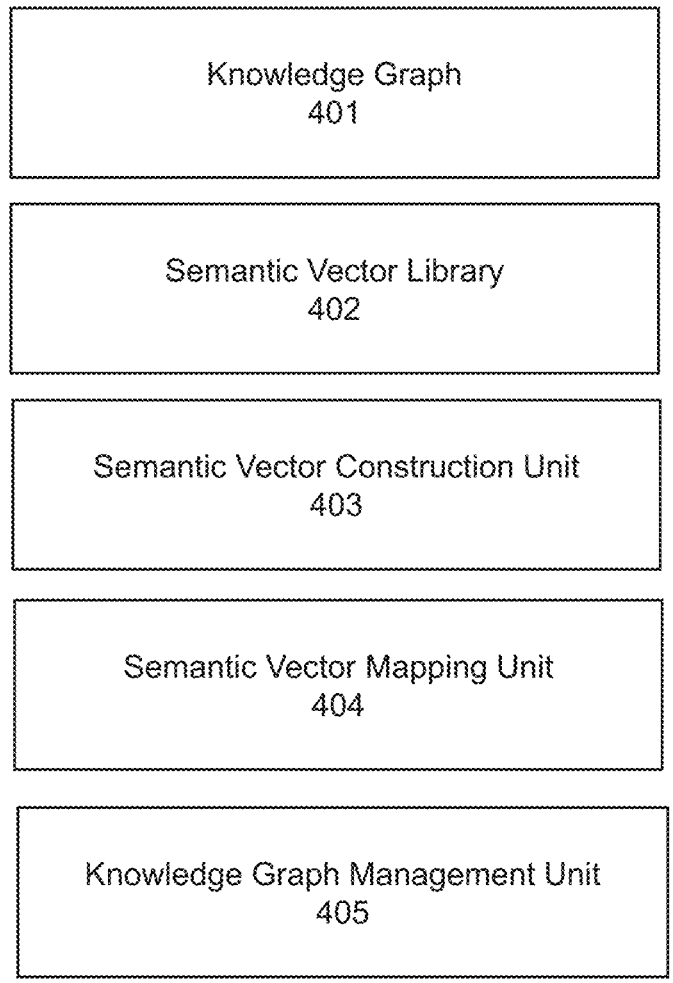
FIG. 4 is a schematic block diagram of an exemplary semantic recognition module.

FIG. 4 is a schematic block diagram of an example semantic recognition module 203. The semantic recognition module 203 may include one or more knowledge graphs 401, one or more semantic vector libraries 402, one or more semantic vector construction units 403, one or more semantic vector mapping units 404, and/or one or more knowledge graph management unit 405. The knowledge graph 401 may include one or more semantic vectors, and may also include associations among multiple semantic vectors. A semantic vector may include one or more letters, words, or phrases that have the same meaning. For example, the semantic vector "I" may include "I," "Me," "Myself," and so on. In some embodiments of the present disclosure, the knowledge graph 401 may include associations among a plurality of semantic vectors and semantic vectors. For example, the knowledge graph 401 may include semantic vectors such as "today," "weather," "sunny," "rain," and may also include associations among semantic vectors such as "today—weather—sunny." In some embodiments of the present disclosure, the knowledge graph 401 may be stored in system storage module 207.

The semantic vector library 402 may store one or more semantic vectors. The semantic vector may be pre-stored in the semantic vector library 402 or may be obtained from the semantic vector construction unit 403. The semantic vector construction unit 403 may construct a semantic vector based on the collected information. The collected information may be the information processed in step 302 or the information directly obtained in step 301. The semantic vector construction unit 403 may be coupled to the processing module 202 or the collection module 201. The semantic vector construction unit 403 may also be coupled to the system storage module 207. The semantic vector construction unit 403 may store the constructed semantic vector in the semantic vector library 402, and may also store the constructed semantic vector in the system storage module 207.

The semantic vector mapping unit 404 may map the semantic vectors in the semantic vector library 402 (and/or the system storage module 207) into the knowledge graph 401. The mapping may include matching and corresponding the semantic vectors in the semantic vector library with the spatial positions in the knowledge graph. When the spatial position of the semantic vector changes in the knowledge graph, the semantic vector library may correspond to the changed spatial position. The semantic vector mapping unit 404 may also directly map the semantic vectors in the semantic vector construction unit 403 into the knowledge graph 401.

The knowledge graph management unit 405 may cluster the mapped semantic vectors in the knowledge graph 401, and may also remove the duplicate semantic vectors in the knowledge graph and may also tag the clusters of the semantic vectors. Further, the knowledge graph management unit 405 may construct associations among semantic vectors in different clusters according to the clustered semantic vectors. The knowledge graph management unit 405 may update the knowledge graph 401 according to the clustered semantic vectors and the associations of semantic vectors in different classes. In some embodiments of the present disclosure, the knowledge graph 401 may generate or represent a result of a semantic recognition. The result may represent a semantic recognition result for the collected information. The result may be transmitted to the evaluation module 204 and/or the comparison module 205 or may be stored in the system storage module 207. The knowledge graph 401 may also match a semantic vector to a user. The semantic vector mapping unit 403 may map the user onto the semantic vector in the matched knowledge graph. The knowledge graph management unit 405 may cluster the users according to the matched semantic vectors. Further, the knowledge graph management unit 405 may construct associations among users of the same type or different types that match the semantic vectors according to the clustered semantic vectors.

The description above about the semantic recognition module is provided for illustration purposes, and should not be considered as the only practical embodiment. For persons having ordinary skills in the art, after understanding the basic principles of the required information, various variations and modifications of generating the optimised location information may be conducted without departing from the principle. However, those variations and modifications may not depart the spirit and scope of this disclosure.

Figure 5:
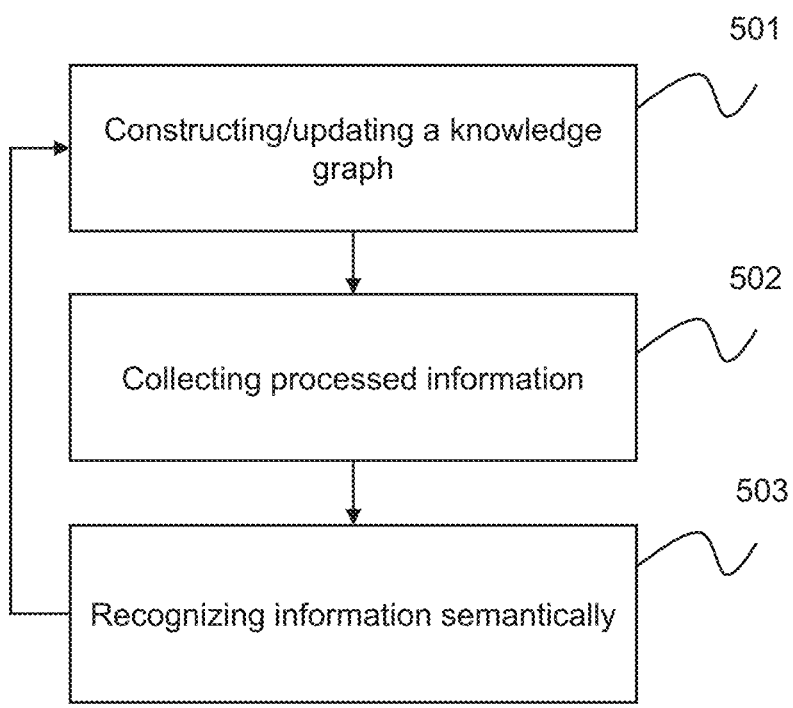
FIG. 5 is a flowchart of an exemplary process for constructing and/or updating a knowledge graph.

FIG. 5 is a flowchart of an exemplary process for constructing and/or updating a knowledge graph. When the knowledge graph has not been constructed, step 501 may include constructing a knowledge graph. The construction of the knowledge graph may be based on existing semantic vectors stored in the semantic vector library 402 (and/or in the system storage module 207). Step 501 may be performed by the knowledge graph management unit 405. After constructing the knowledge graph in step 501, the semantic recognition module 203 may collect the information in step 502. The collected information may be the information processed in step 302 or the information directly obtained in step 301. After the information is collected in step 502, it may be semantically recognized in step 503 to generate one or more semantic vectors. After the information is semantically recognized, the semantic recognition module 203 may perform step 501 again to update the knowledge graph according to the semantically recognized semantic vectors in step 503. The knowledge graph may be stored in the semantic recognition module 203 and/or the system storage module 207. The knowledge graph may be the knowledge graph 401.

Figure 6:
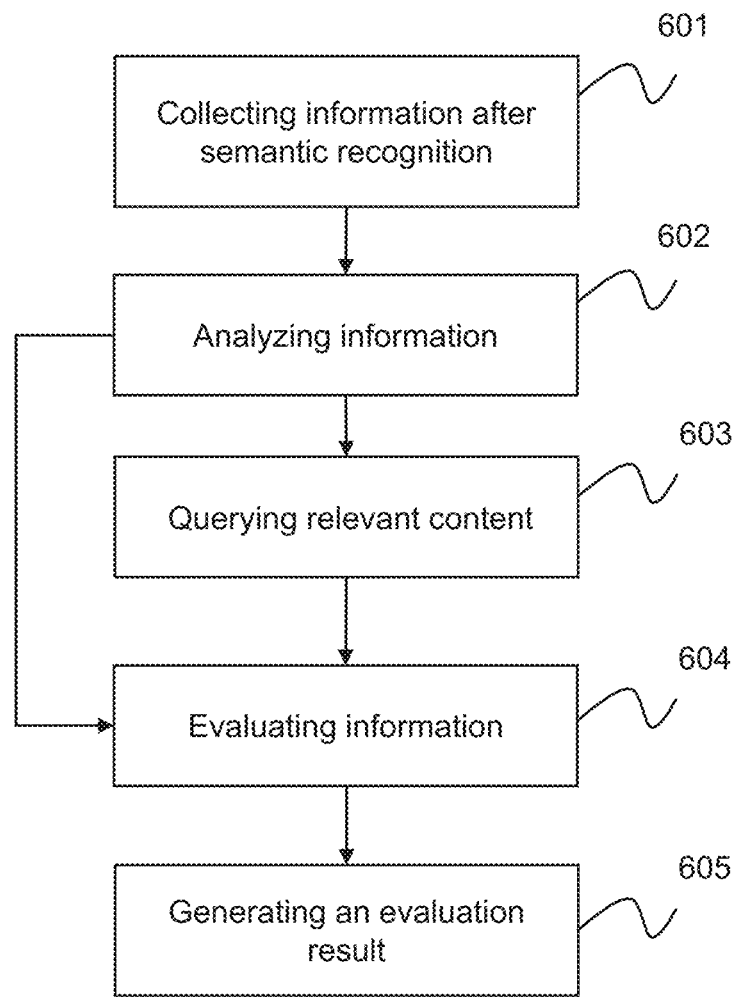
FIG. 6 is a flowchart of an exemplary process for evaluating semantic information.

In some embodiments of the present disclosure, steps 304 and 306 of process 300 (shown in FIG. 3) may be with reference to the exemplary semantic information evaluation process 600 shown in FIG. 6. The process 600 may be implemented by the evaluation module 204 (and/or other one or more components of the semantic analysis system 110). Step 601 may include collecting one or more pieces of information after semantic recognition (e.g., the information obtained in step 303). The information may be obtained from step 503 (or step 303) or may be obtained from the system storage module 207. After collecting the information after semantic recognition in step 601, it may be analyzed in step 602. Step 602 may include extracting words in the information according to word types. The word types may include but are not limited to, nouns, verbs, adjectives, adverbs, auxiliary words, onomatopoeia, numbers, emojis, unique symbols, or the like, or any combination thereof. Alternatively, the text information may also be processed using a specific word segmentation algorithm. The word segmentation algorithm may include but is not limited to a forward maximum matching algorithm, an inverse maximum matching algorithm, a minimum segmentation algorithm, a two-way maximum matching algorithm, a feature scanning algorithm, a flag segmentation algorithm, a word class labeling algorithm, an understanding word segmentation algorithm, a mutual information segmentation algorithm, statistical word-taking algorithm, statistical machine learning algorithm, or the like, or any combination thereof. Step 602 may also include recognizing the entity of the textual information. The entity may include, but is not limited to, a product, service, institution name, person name, place name, time, date, currency, number, percentage, or the like, or any combination thereof. The entity recognition method may include but is not limited to, a hidden Markov model, a maximum entropy model, a support vector machine, a rule-based recognition method, a statistical-based recognition method, or the like, or any combination thereof. Step 602 may further include analyzing whether the information includes prediction content (for example, the content that may be used to predict a rise or fall range of a specific stock in one day or a particular time interval) or statement information (for example, the content about the index trend in one day or a particular time interval) according to the result of word segmentation and entity recognition. In some embodiments of the present disclosure, the above-described method of word segmentation and entity recognition may be implemented by the semantic recognition module 203.

After the information is analyzed in step 602, in step 603, the semantic analysis system 110 may query the related content according to the entity name obtained through the entity recognition in step 602. The entity name may include nouns having practical meanings, such as "Bill Gates," "Microsoft," and the like. The related content may include any determined information such as a database, a thesis, a web page, and the like. For example, the information that has been determined may come from "Wikipedia," "Sina News," "Future Speed" (Bill Gates Autobiography) and so on. Step 603 may include ranking the credibility and completeness of the queried determined information. For one or more predictive or declarative content in the information, the evaluation module 204 may rank one or a plurality of pieces of determined information and match them to the predictive or declarative content. For example, for the declarative content of "there are more than 200 stocks falling by their daily limit," the evaluation module 204 may filter out the results related to the number of stocks that have risen and fallen, and rank them according to the credibility and integrity. The evaluation module 204 may match one or more results to the declarative content described above based on the ranking. Step 603 may also include analyzing the degree of association of the queried determined information with the predictive or declarative content. Further, the determined information may be ranked according to the degree of the association to the content, and the evaluation module 204 may match the one or more pieces of determined information to the predictive or declarative content based on the ranking. For example, the statement that "there are more than 200 stocks falling by their daily limit," the result of "there are 225 stocks falling by their daily limit" may have a higher ranking and association than the result of "there are more than 37 stocks falling by their daily limit". The evaluation module 204 may further match one or more pieces of the determined information to the declarative content described above based on the ranking.

The evaluation module 204 may evaluate the information in step 604 after finding related content or the like in step 603. In some embodiments of the present disclosure, the evaluating may include comparing the matched determined information to the predictive or declarative content to derive the correctness of the predictive or declarative content. The predictive content may also be stored first. After a particular time point, that is, after the predicted time point is reached, the evaluation module 204 may further search for the determined information according to the predictive content and compare it to obtain the correctness of the predictive content.

In some embodiments of the present disclosure, after the evaluation module 204 completing the analysis of the information in step 602, the analyzed information may be evaluated directly in step 604. The evaluating may include comparing the predictive or declarative content contained in the information to determine the correctness and contradiction among the contents. The evaluation module 204 may generate an evaluation result in step 605 after performing step 604 and evaluating the information. For example, the evaluation result may include "User C's forecast accuracy for stock ABC this week is 75%" and "92% of posts of User D in stock forum B this month are credible." In some embodiments of the present disclosure, step 605 may include matching users to predictive or declarative contents. Further, the evaluation result may be matched to the users.

Figure 7:
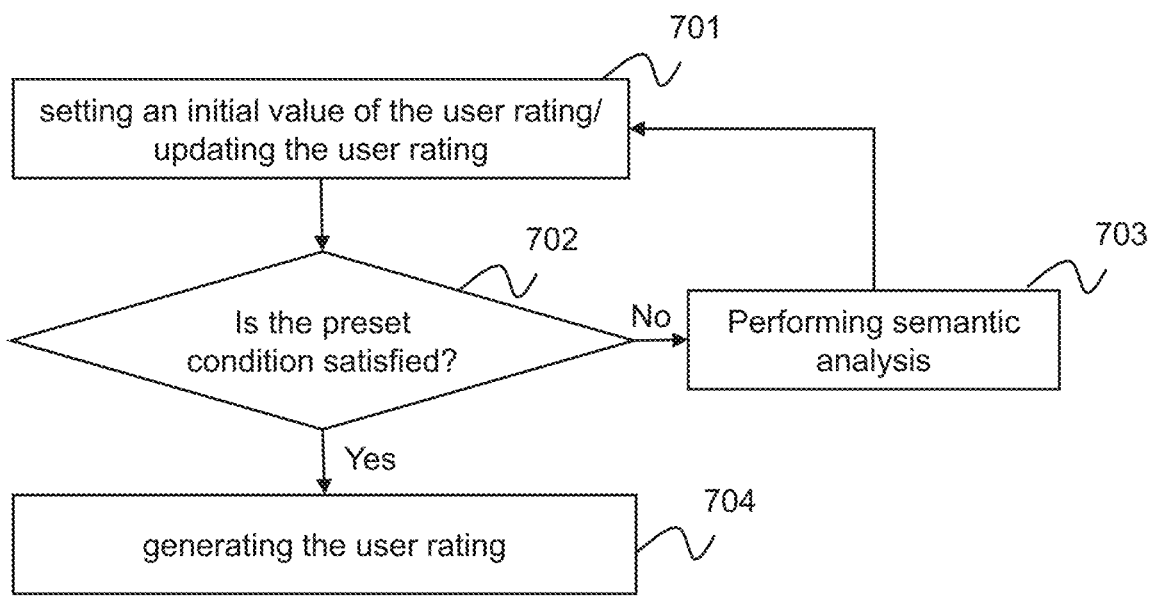
FIG. 7 is a flowchart of an exemplary process for updating a user rating in a semantic analysis system.

FIG. 7 is a flowchart of an exemplary process for updating a user rating in a semantic analysis system. Step 701 may include setting an initial value of the user rating. The user may be the user that matches the predictive or declarative content in step 605. Alternatively, the initial values of all user ratings may be the same (e.g., the initial values of the user ratings may be 0). Step 702 may include determining if a preset condition is satisfied. The preset condition may be related to the information described in step 605. For example, the preset condition may be that determining whether the semantic information of a particular user A is wholly analyzed, determining whether the information of one or more information sources 130 is wholly analyzed, or may be a fixed number of times (for example, performing 1000 times of semantic analysis). The preset condition may be related to previous ratings or the changes of continuous ratings (for example, determining whether the new rating is 5% higher than the previous rating, or whether the two following ratings change). If the preset condition is not met, the semantic analysis system 110 may perform semantic analysis in step 703. The semantic analysis may be implemented by one or more modules in the semantic analysis system 110.

In some embodiments of the present disclosure, step 703 may include matching of the users with predictive or declarative contents as described elsewhere in this disclosure. Step 703 may also include comparing the determined information to the predictive or declarative contents as described elsewhere in this disclosure to obtain an evaluation result. The evaluation result may include the correctness of the predictive or declarative contents. In some embodiments of the present disclosure, the evaluation result may be associated with a specific user or a specific type of users. In some embodiments of the present disclosure, the evaluation result may include the amount of knowledge and the difficulty for predicting the predictive or declarative contents (also referred to therein as prediction difficulty) (e.g., the prediction difficulty and the amount of knowledge of the declarative content "the index is rising today" is lower, and the prediction difficulty and the amount of knowledge of the predictive content "the index of one stock will rise more than 8.5% tomorrow" is higher).

The semantic analysis system 110 may update the user's rating based on the evaluation result in step 701 after completing step 703. In some embodiments of the present disclosure, the amount of knowledge and the prediction difficulty of the content may affect the rating. Further, the more significant the amount of knowledge and the more difficult the prediction is, if the content is correct, the higher rating may be obtained. In some embodiments of the present disclosure, the predictive content may obtain a higher rating than the declarative content obtains.

When the preset condition is satisfied in step 702, the semantic analysis system 110 may generate one or more user ratings in step 704. In some embodiments of the present disclosure, the process 700 may also include ranking a plurality of users. In some embodiments of the present disclosure, the semantic analysis system 110 may rank the plurality of users based on the user ratings. Further, the semantic analysis system 110 may implement corresponding measures for the users according to the ranking. The corresponding measures may include rewarding high ranked users and punishing low ranked users. After the corresponding measures are implemented for the users, the semantic analysis system 110 may send the ranking and reward and punishment measures to one or more users. In some embodiments of the present disclosure, a user may communicate with a high ranked user. For example, in finance, users may consult with high ranked users (or referred to herein as "investment experts") on investment techniques, market analysis, and so on. The user may communicates with the high ranked users via the semantic analysis system 110. The communication may be established on a social network. The social network may include real social, short messaging service (SMS), multimedia messaging service (MMS), email, QQ, Microsoft service network (MSN), WeChat, Weibo, Douban, Twitter, Facebook, Instagram, Yahoo Messenger, Reddit, Renren, Instant Messaging Software Tools, Forums, or the like, or any combination thereof.

Figure 8:
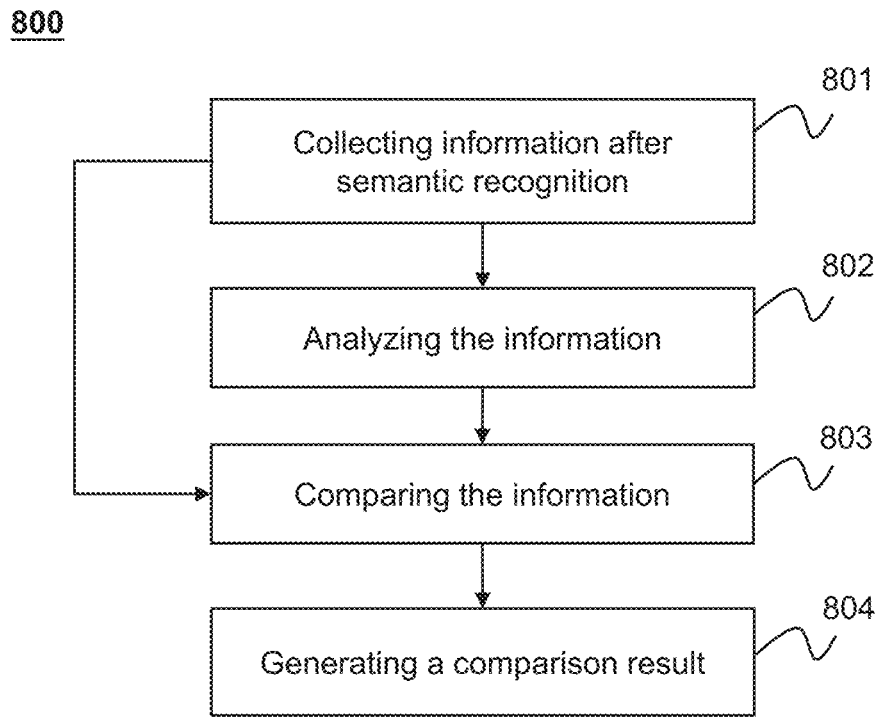
FIG. 8 is a flowchart of an exemplary process for semantics comparison.

In some embodiments of the present disclosure, steps 305 and 307 of process 300 (shown in FIG. 3) may be performed by the exemplary semantic information comparison process 800 shown in FIG. 8. Process 800 may be performed by the comparison module 205 (and/or other components of the semantic analysis system 110). Step 801 may include collecting one or more pieces of information after semantic recognition (such as the information obtained in step 303). The information may be obtained in step 503 (or step 303) or may be obtained from the system storage module 207. After collecting the information after semantic recognition in step 801, it may be analyzed in step 802. The step 802 may include extracting words in the information according to word types. The word types may include but are not limited to, nouns, verbs, adjectives, adverbs, auxiliary words, onomatopoeia, numbers, emojis, unique symbols, or the like, or any combination thereof. Alternatively, the text information may also be processed using a particular word segmentation algorithm. The word segmentation algorithm may include but is not limited to a forward maximum matching algorithm, an inverse maximum matching algorithm, a minimum segmentation algorithm, a two-way maximum matching algorithm, a feature scanning algorithm, a flag segmentation algorithm, a word class labeling algorithm, an understanding word segmentation algorithm, a mutual information word segmentation algorithm, statistical word-taking algorithm, statistical machine learning algorithm, or the like, or any combination thereof. Step 802 may also include categorizing the extracted words. The categorization may include organizing related words into one category. The information may include multiple categories of words. In some embodiments of the present disclosure, step 802 may include determining a closest category of the information based on a statistical algorithm. The statistical algorithm may include, but is not limited to, chi-square statistics, information gain, mutual information, odds ratio, cross entropy, inter-class information difference, keyword statistics, decision tree, Rocchio, naive Bayes, neural network, support vector machine, linear least squares fit, nearest neighbor algorithm, genetic algorithm, sentiment classification, maximum entropy, Generalized Instance Set, synonym configuration, Boolean association rules, position rules, machine learning, or the like, or any combination thereof.

After analysing the information in step 802, the semantic analysis system 110 may compare one or more words of a specified category in the information with one another or compare one or more words in the category with words of other category in the information. In some embodiments of the present disclosure, step 803 may include matching the users to the word classifications based on the information. Further, step 803 may include comparing different users according to the word classification. In some embodiments of the present disclosure, if the words in the collected information have been processed by word segmentation, word classification or directly represented in a processed state (e.g., the collected information may be investment selection information about whether long lines or short lines are preferred on a web page), the collected information may be directly compared in step 803. The semantic analysis system 110 may generate a comparison result in step 804 after comparing the information in step 803. The comparison result may include distinguishing different types of users according to the word classification and comparing the same or different types of users.

Figure 9:
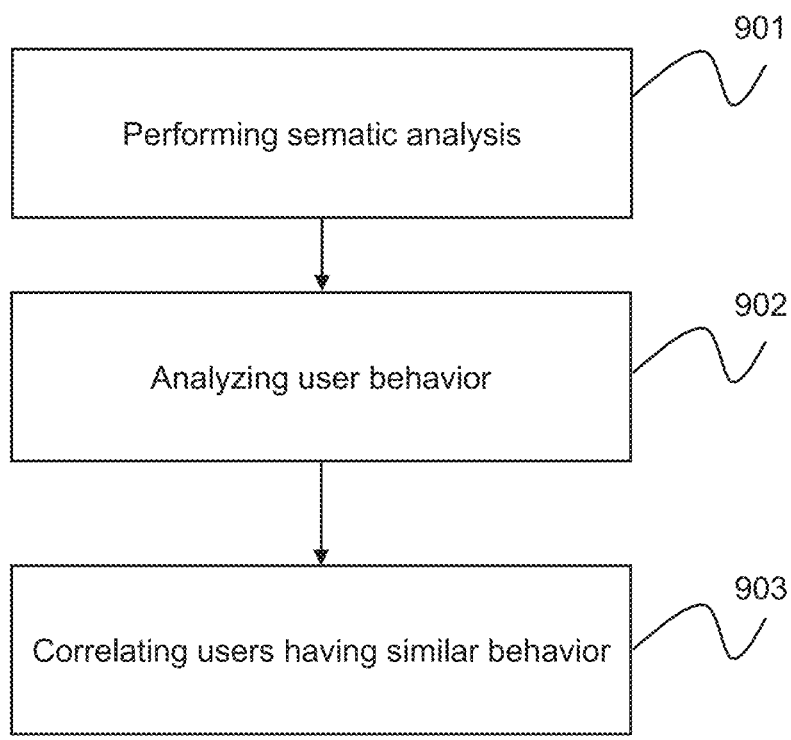
FIG. 9 is a flowchart of an exemplary process for associating users in a semantic analysis system.

FIG. 9 is a flowchart of an exemplary process for associating users in a semantic analysis system 110. The semantic analysis system 110 may perform one or more times of semantic analysis in step 901. The semantic analysis may be implemented by one or more modules in the semantic analysis system 110. The semantic analysis system 110 may analyze user behavior in step 902 after performing the semantic analysis in step 901. Step 902 may include information collection, word segmentation, and/or word classification as described in step 802 or other embodiments of the present disclosure. Step 902 may further include determining user behavior included in the information after the semantic recognition based on the classified words. For example, in finance, the user behavior may include short-term investments, long-term investments, ultra-short-term investments, full investments, "top-selling" investments, "small win-and-stop" investments, short-selling investments, or the like. In some embodiments of the present disclosure, the categories of words after word classifications may be associated with user behaviors. Further, one or more of the categories may be associated with one or more user behaviors. In finance, words with similarities such as "short-term investment", "high risk", "speculation", or "tail market operation" may be sorted into one category and associated with the user investment behavior of "short-term investment". Alternatively, the user behaviors may be digitized, such as "short-term investment" may be represented by "holding period <X days." In finance, the representation of the user behaviors may include, but is not limited to, holding period, an average value of a single income, the maximum value of a single income, the minimum of a single income, an expected annualized rate of return, the number of transactions, a profit-loss ratio, success rate, a maximum value of a retracement rate, a winning rate in a week, Sharpe ratio, a maximum number of consecutive days no stock selected, or an average number of days selecting stocks.

The semantic analysis system 110 may, in step 903, correlate users with those having similar behaviors after analyzing the user behaviors in step 902. In some embodiments of the present disclosure, step 903 may include matching the users to the user behavior based on the information. In some embodiments of the present disclosure, step 903 may include comparing the user behaviors analyzed in step 902. Further, step 903 may include comparing the users based on the matched user behaviors. Step 903 may further include associating users having similar behaviors based on the comparison. The association may be established on a social network. The social network may include real social, SMS, MMS, email, QQ, MSN, WeChat, Weibo, Douban, Twitter, Facebook, Instagram, Yahoo Messenger, Reddit, Renren, Instant Messaging Software Tools, Forums, or the like, or any combination thereof.

In some embodiments of the present disclosure, step 903 may be combined with process 700 to rate and rank users who are associated and have with similar behaviors. Further, the combination may further include associating users with higher or lower ratings among the users in step 903. Step 903 may also further include causing the users to communicate with the associated users with higher ratings. The communication may be implemented on a social network. The social network may include real social, SMS, MMS, email, QQ, MSN, WeChat, Weibo, Douban, Twitter, Facebook, Instagram, Yahoo Messenger, Reddit, Renren, Instant Messaging Software Tools, Forums, or the like, or any combination thereof. For example, in finance, the above combination may include the semantic analysis system 110 automatically rates the users with similar investment behaviors associated in step 903 based on the correctness of the predictive and statement contents. Further, users with high ratings may be automatically tagged as "investment experts" by the semantic analysis system 110, and users with low ratings may communicate with "investment experts," wherein the users with low ratings may be associated with "investment experts" and have similar investment behaviors with "investment experts." The users with low ratings may also, through the semantic analysis system 110, communicate with the "investment experts" who are not associated with the users with low ratings and have different investment behaviors from the users with low ratings. The communication may be established on a social network. The social network may include real social, SMS, MMS, email, QQ, MSN, WeChat, Weibo, Douban, Twitter, Facebook, Instagram, Yahoo Messenger, Reddit, Renren, Instant Messaging Software Tools, Forums, or the like, or any combination thereof.

Figure 10:
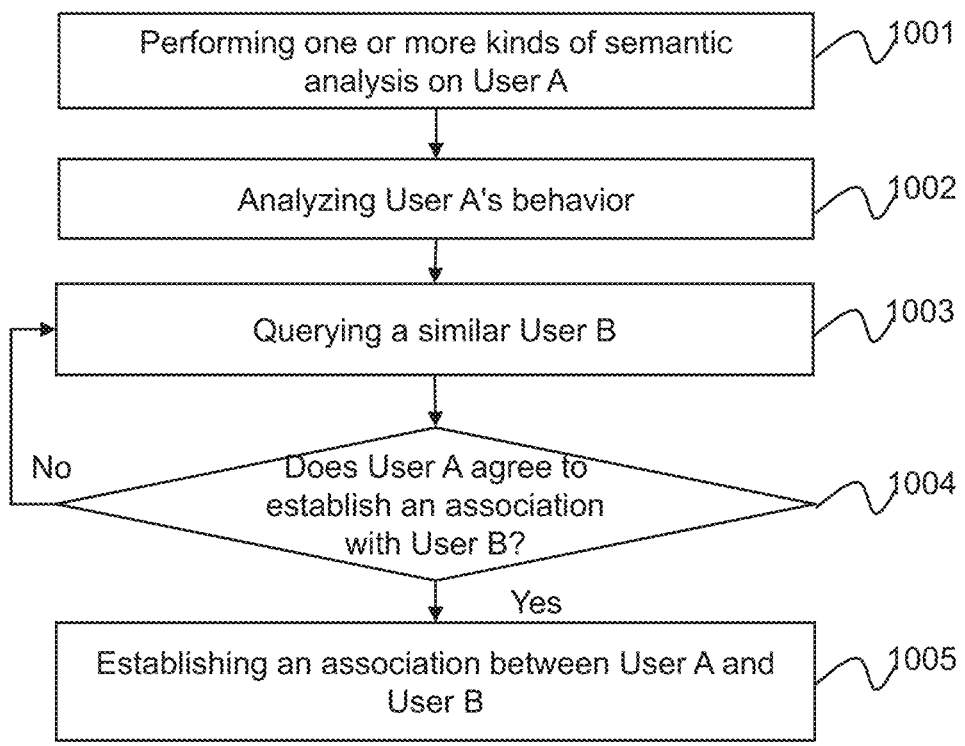
FIG. 10 is a flowchart of an exemplary process for searching for and associating users in a semantic analysis system.

FIG. 10 is a flowchart of an exemplary process for searching for and associating users in a semantic analysis system. Process 1000 may be an embodiment of process 900. As shown in FIG. 10, the semantic analysis system 110 may first perform one or more times of semantic analysis on User A in step 1001. The semantic analysis may be implemented by one or more modules of the semantic analysis system 110 (such as the semantic recognition module 203, the evaluation module 204, and/or the comparison module 205). User A's behavior may be analyzed in step 1002 after the semantic analysis system 110 performs the semantic analysis in step 1001. Step 1002 may include word segmentation and word classification as described elsewhere in this disclosure. Step 1002 may further include determining the user behaviors included in the information after the semantic recognition based on the classified words. In some embodiments of the present disclosure, step 1002 may include performing entity recognition on the information after word segmentation described elsewhere in the present disclosure. Further, step 1002 may include analyzing whether the information matching User A contains prediction contents or statement contents based on the result of the word segmentation, the entity recognition, or the like. In some embodiments of the present disclosure, step 1002 may include comparing the prediction contents or statement contents as described in other embodiments of the present disclosure to obtain ratings of the information. Step 1002 may further include integrating and processing the ratings of the information that matches User A to obtain User A's rating. In some embodiments of the present disclosure, step 1002 may include collecting other information of User A. The other information may include User A's age, gender, geographic location, hobbies, or the like, or any combination thereof.

The semantic analysis system 110 may query User B with a similar behavior in step 1003 after analyzing User A's behavior in step 1002. The user B may have similar behavior with User A. In some embodiments of the present disclosure, step 1003 may include comparing one or more users with the behavior of User A to filter out users with similar user behavior. Further, step 1003 may include sorting the filtered users. The sorting may be based on the degree of matching of the other information. In some embodiments, User A may provide a filter condition to the semantic analysis system 110, so that the semantic analysis system 110 may automatically filter out the users who do not satisfy the filter condition according to the filter condition provided by User A. The semantic analysis system 110 may send a confirmation information to the user A and the user B in step 1004 after finding a similar user B (or a plurality of similar users) in step 1003. The confirmation information may include data of both users (e.g., age, gender, geographic location, hobbies, etc. mentioned in other embodiments of the disclosure). In some embodiments of the present disclosure, the user may also set a whitelist, a blacklist, a filter condition, whether to accept an association with a user having a particular behavior, such that the semantic analysis system 110 may automatically determine whether the association can be confirmed. In some embodiments of the present disclosure, step 1004 may include the semantic analysis system 110 provides a temporary association for causing temporary communication between the two users to determine whether to establish a formal association. If a party refuses or does not confirm the establishment of the association in step 1004, the semantic analysis system 110 may search for a user similar to User A in step 1003 again until both User A, and the found User B agree to establish an association. If both parties agree to establish an association, the semantic analysis system 110 may establish an association between User A and User B in step 1005.

Figure 11:
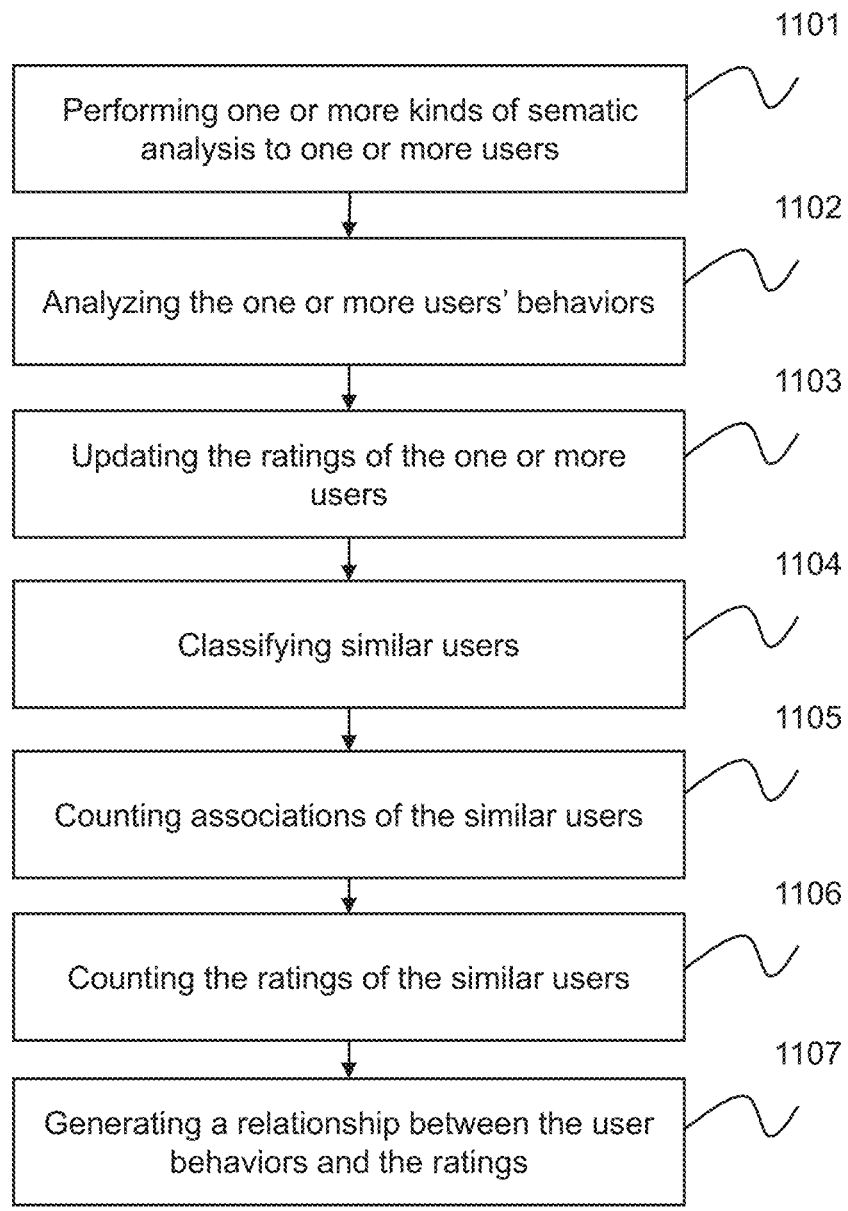
FIG. 11 is a flowchart of an exemplary process for generating relationships between user behavior and user ratings in a semantic analysis system.

FIG. 11 is a flowchart of an exemplary process for generating a relationship between user behavior and user ratings in a semantic analysis system. Step 1101 may include matching information to users and performing semantic analysis on the information that matches the targeted user. The semantic analysis may be implemented by one or more modules of the semantic analysis system 110 (such as the semantic recognition module 203, the evaluation module 204, and/or the comparison module 205). In some embodiments of the present disclosure, the step 1101 may target to one or more users. In step 1102, the semantic analysis system 110 may analyze user behaviors of users that are targeted in step 1101 after the semantic analysis is performed in step 1101. Step 1102 may include word segmentation and word classification as described elsewhere in the present disclosure. Step 1102 may further include determining one or more user behaviors included in the information after the semantic recognition based on the classified words. In some embodiments of the present disclosure, step 1102 may include entity recognition on the information after word segmentation described elsewhere in this disclosure. Further, step 1102 may include analyzing whether the matched information contains the content of the prediction class or the statement class based on the result of the word segmentation processing and the entity identification, or the like. In some embodiments of the present disclosure, step 1102 may include comparing the content of the predictive class or statement class as described in other embodiments of the present disclosure to obtain a rating of the information. Step 1102 may further include integrating and processing the ratings of the one or more matched information to obtain a rating of one or more users. In some embodiments of the present disclosure, step 1102 may include collecting other information of the one or more users. The other information may include user's age, gender, geographic location, hobbies, or the like, or any combination thereof. The semantic analysis system 110 may update the ratings of the users in step 1103 after analyzing the user behaviors in step 1102. Step 1103 may be implemented by process 700 (shown in FIG. 7). In step 1104, the semantic analysis system 110 may classify the users after updating the ratings for the users in step 1103. The classifying may include dividing the users into one or more different categories based on user behaviors. Users of the same category may have similar user behavior. The same user may be divided into one or more different categories. After step 1104 is completed, the semantic analysis system 110 may count the associations of the similar users in step 1105. Step 1105 may include correlating the associations among users in a same category (having similar user behavior). Further, the association may include similarity of user backgrounds. For example, in finance, step 1105 may include statistically analyzing more preferred types of investment of investors (e.g., short-term investments, long-term investments, ultra-short-term investment stocks, bonds, gold, paper gold, silver, foreign exchange, precious metals, futures, money funds, etc.) in different age groups, genders, and regions. Step 1106 may include statistically analyze the ratings of users in a same category. In some embodiments of the present disclosure, step 1106 may include statistically analyze the relationship between user backgrounds and ratings. For example, in finance, step 1106 may include statistically analyze the ratings of investors of different age groups, genders, and regions, and further predicting the accuracy of ratings.

After statistically analyze the associations (in step 1105) and ratings (in step 1106) of the users of the same category, the semantic analysis system 110 may generate a relationship between user behaviors and ratings in step 1107 The relationship between user behaviors and ratings may include the relationship between user behaviors and ratings for different categories. In finance, the relationship may include a relationship between different investment behaviors and ratings or prediction accuracies.

Figure 12:
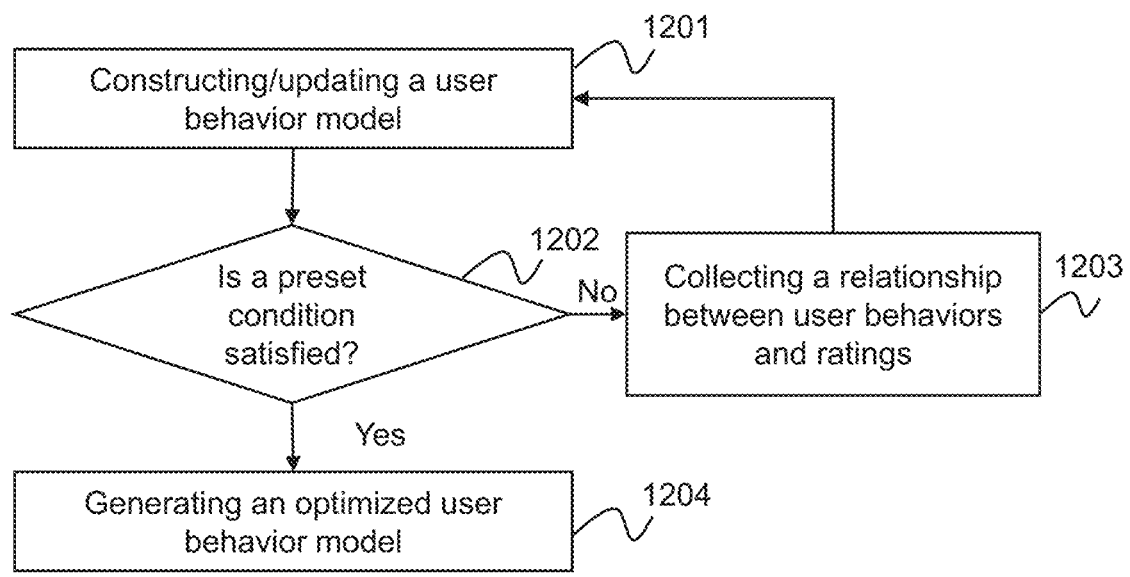
FIG. 12 is a flowchart of an exemplary process for optimizing a user behavior model in a semantic analysis system.

FIG. 12 is a flowchart of an exemplary process for optimizing a user behavior model in a semantic analysis system. The process 1200 may be performed by one or more modules of the semantic analysis system 110. In the beginning, the semantic analysis system 110 may construct a user behavior model in step 1201. The user behavior model may be the most common user behavior. In finance, step 1201 may include constructing an investment behavior model that may include holding period, an average value of a single income, the maximum value of a single income, the minimum of a single income, an expected annualized rate of return, the number of transactions, a profit-loss ratio, success rate, a maximum value of a retracement rate, a winning rate in a week, the Sharpe ratio, a maximum number of consecutive days no stock selected, or an average number of days selecting stocks. The investment behavior model may initially set the above items as an average value obtained elsewhere in the disclosure or from other sources. Step 1202 may include determining if a preset condition is satisfied. The preset condition may be a fixed number of times (for example, determining whether the update is performed 100 times), or may be related to a previous model or the change of a continuous model (for example, determining whether the model does not change any more after two continuous updates). If the preset condition is not met, the semantic analysis system 110 may collect the relationship between the user behaviors and the ratings in step 1203. The relationship between the user behaviors and the ratings may be obtained in step 1107. After the semantic analysis system 110 collects the user behavior model in step 1203, step 1201 may be re-executed to update the optimized user behavior model until the preset condition is met. If the predetermined condition is met, the semantic analysis system 110 may generate an optimized user behavior model. In some embodiments of the present disclosure, the user behavior model may be output by the output module 206 or may be stored in the system storage module 207. In finance, the process 1200 shown in FIG. 12 may include updating the optimized user investment model based on a relationship between user investment behaviors and ratings to generate an investment behavior model associated with users with high ratings (or "investment experts"). The model may be learned or imitated by the user.

Figure 13:
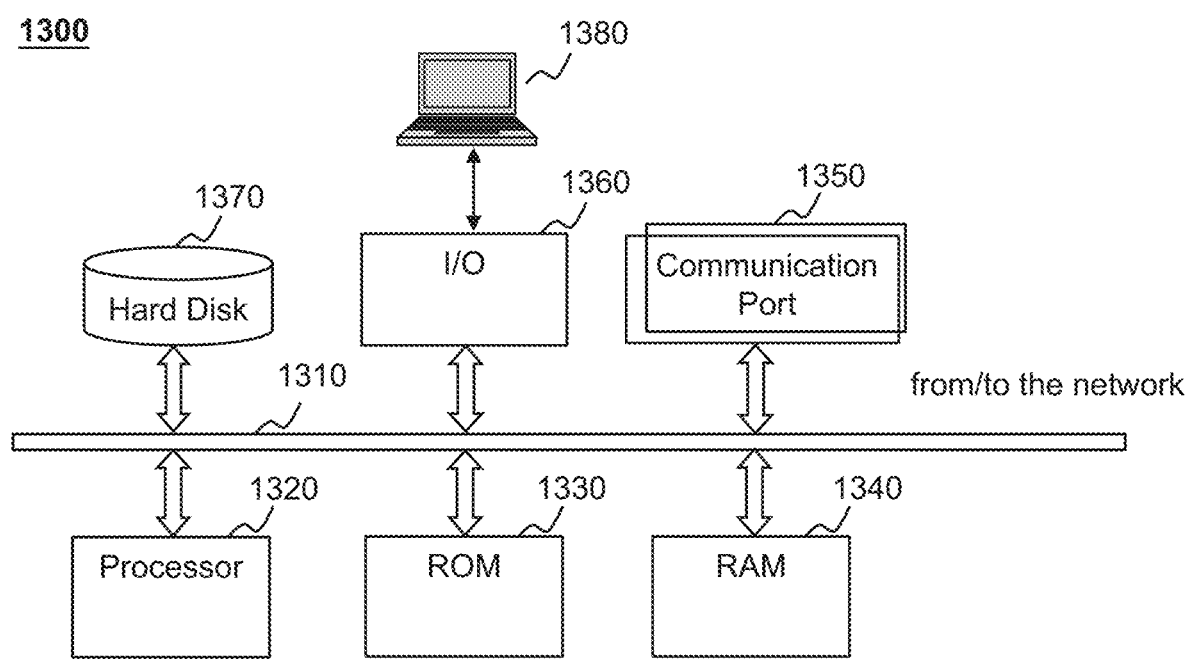
FIG. 13 is a schematic configuration of an exemplary computer device of a semantic analysis system.

FIG. 13 is a schematic configuration illustrating an exemplary computer device of a semantic analysis system 110. Computer 1300 may be used to implement a particular system disclosed in this present disclosure. The particular system may use a functional block diagram to explain the hardware platform containing one or more user interfaces. The computer 1300 may be implemented as one or more components, modules, units, sub-units of the currently described in the semantic analysis system 110. Additionally, the system 100 may be implemented by computer 1300 through its hardware devices, software programs, firmware, and combinations thereof. The computer may be a computer with general or specific functions. Both types of the computers may be configured to implement any particular system according to some embodiments of the present disclosure. For convenience, FIG. 13 depicts only one computer, but the computer functions for providing information t required may be implemented by a group of similar platforms in a distributed mode to disperse the processing load of the system.

As shown in FIG. 13, the computer 1300 may include an internal communication bus 1310, processor 1320, read-only memory (ROM) 1330, random access memory (RAM) 1340, communication port 1350, input/output component 1360, input/output component 1360, hard disk 137, and/or user interface 1380. The internal communication bus 1310 may be configured to enable data communication among the components of the computer 1300. The processor 1320 may be configured to execute program instructions to perform any of the functions, components, modules, units, sub-units of the semantic analysis system 110 described in this present disclosure. The processor 1320 may include one or more processors. The communication port 1350 may be configured to enable data communication between the computer 1300 and another components of the system 100, such as the information source 130 (e.g., via network 120). The computer 1300 may also include different types of program storage units and data storage units, e.g., a hard disk 1370, a read-only memory (ROM) 1330, a random-access memory (RAM) 1340, various data files applicable to computer processing and/or communication, and/or some program instructions executed possibly by the processor 1320. The input/output component 1360 may support input/output data flows between the computer 1300 and other components of system 100, such as the user interface 1380. The computer 1300 may also send and receive information and data from the network 120 via the communication port 1350.

It may be understood by those skilled in the art that various alterations and improvements may be achieved according to some embodiments of the present disclosure. For example, the various components of the system described above may be all achieved by hardware devices but may also be implemented only through software solutions, for example, installing the system on a current server. Additionally, the location information disclosed here may be provided by a firmware, a combination of a firmware and a software, a combination of a firmware and a hardware, or a combination of a firmware, a hardware and a software.

The description above is provided for illustration purposes, and should not be considered as the only embodiment, for persons having ordinary skills in the art, multiple variations and modifications may be made under the teachings of the present disclosure. However, those variations and modifications should not depart from the scope of the present disclosure.

What is claimed is:

1. A method for semantic analysis performed by a computer device in finance, comprising:
    constructing, by the computer device, a knowledge graph;
    acquiring, by the computer device, information published by a plurality of users on a social network through a network;
    generating, by the computer device, a user behavior of each of the plurality of users by processing the information based on semantic recognition by using the knowledge graph;
    determining, by the computer device, a user rating of the each of the plurality of users based on correctness of the information by processing the information through the semantic recognition;
    dividing, by the computer device, the plurality of users into at least one category based on the user behavior of the each of the plurality of users by mapping the plurality of users onto a plurality of semantic vectors mapped into the knowledge graph, wherein the plurality of semantic vectors are constructed based on the processed information, and users of a same category have similar user behavior; and
    generating, by the computer device, a relationship between user behaviors and user ratings based on the at least one category of the plurality of users.

2. The method of claim 1, wherein the information includes predictive content or declarative content, and the determining, by the computer device, a user rating of each of the plurality of users based on correctness of the information by processing the information based on the semantic recognition comprises:
    setting an initial value of the user rating of the each of the plurality of users;
    obtaining an evaluation result by comparing the predictive content or the declarative content with determined information, wherein the evaluation result includes correctness of the predictive content or the declarative content; and
    updating the initial value of the user rating based on the evaluation result.

3. The method of claim 2, wherein the obtaining, by the computer device, an evaluation result by comparing the predictive content or the declarative content with determined information comprises:
    ranking credibility and completeness of the determined information;
    matching the determined information to the predictive content or the declarative content based on the ranking; and
    comparing matched determined information to the predictive content or the declarative content to derive the correctness of the predictive content or the declarative content.

4. The method of claim 1, wherein the generating, by the computer device, a relationship between user behaviors and user ratings based on the at least one category of the plurality of users comprises:
    correlating associations among the users of the same category to generate an association result;
    analyzing user ratings of the users of the same category to generate an analyzing result; and
    generating the relationship between the user behaviors and the user ratings based on the association result and the analyzing result.

5. The method of claim 4, wherein the association includes a similarity of user backgrounds.

6. The method of claim 1, wherein the generating, by the computer device, a user behavior of each of the plurality of users by processing the information based on semantic recognition by using the knowledge graph comprises:
    generating standard information based on the information; and
    generating the user behavior based on the standard information and the knowledge graph.

7. The method of claim 6, wherein the generating, by the computer device, the user behavior based on the standard information and the knowledge graph comprises:
    splitting the standard information into one or more semantic fields;
    mapping the one or more semantic fields into the knowledge graph, the knowledge graph recognizing the one or more semantic fields based on an association among the one or more semantic fields; and
    generating the user behavior based on a recognized result that is generated by the knowledge graph matched with the one or more semantic fields.

8. The method of claim 7, further comprising:
    searching for another user with a similar user behavior based on the user behavior of the each of the plurality of users.

9. The method of claim 8, wherein the searching, by the computer device, for another user with a similar user behavior based on the user behavior of the each of the plurality of users comprises:
    clustering the one or more semantic fields mapped into the knowledge graph, the knowledge graph constructing, based on the clustered one or more semantic fields, associations among the one or more semantic fields in one or more clusters;

mapping, based on the knowledge graph, the plurality of users onto at least one of the one or more semantic fields, the at least one semantic field corresponding to the user behavior of the each of the plurality of users;

determining, based on the clustered one or more semantic fields and the at least one semantic field, a cluster that the each of the plurality of users belongs to; and constructing, based on the clustered one or more semantic fields and the knowledge graph, associations between the plurality of users and the another user, the another user being of a same type or a different type with the plurality of users, which is mapped onto the one or more semantic fields.

10. The method of claim 1, further comprising:
constructing a user behavior model based on the relationship between user behaviors and user ratings.

11. The method of claim 1, wherein the generating, by the computer device, a relationship between user behaviors and user ratings based on the at least one category of the plurality of users comprises:

ranking the plurality of users based on the user ratings; and associating users of higher ratings with users of lower ratings based on the at least one category of the plurality of users.

12. A system for semantic analysis in finance comprising:
at least one storage medium including a set of instructions; and at least one processor in communication with the at least one storage medium, wherein when executing the set of instructions, the at least one processor is directed to cause the system to perform operations comprising:

constructing, by the computer device, a knowledge graph;

acquiring, by the computer device, information published by a plurality of users on a social network through a network;

generating, by the computer device, a user behavior of each of the plurality of users by processing the information based on semantic recognition by using the knowledge graph;

determining, by the computer device, a user rating of the each of the plurality of users based on correctness of the information by processing the information based on the semantic recognition;

dividing, by the computer device, the plurality of users into at least one category based on the user behavior of the each of the plurality of users by mapping the plurality of users onto a plurality of semantic vectors mapped into the knowledge graph, wherein the plurality of semantic vectors are constructed based on the processed information, and users of a same category have similar user behavior; and generating, by the computer device, a relationship between user behaviors and user ratings based on the at least one category of the plurality of users.

13. The system of claim 12, wherein the generating, by the computer device, a relationship between user behaviors and user ratings based on the at least one category of the plurality of users comprises:

correlating associations among the users of the same category to generate an association result;

analyzing user ratings of the users of the same category to generate an analyzing result; and generating the relationship between the user behaviors and the user ratings based on the association result and the analyzing result.

14. The system of claim 12, wherein the information includes predictive content or declarative content, and the determining, by the computer device, a user rating of the each of the plurality of users based on correctness of the information by processing the information based on the semantic recognition comprises:

setting an initial value of the user rating of the each of the plurality of users;

obtaining an evaluation result by comparing the predictive content or the declarative content with determined information, wherein the evaluation result includes correctness of the predictive content or the declarative content; and updating the initial value of the user rating based on the evaluation result.

15. The system of claim 14, wherein the obtaining, by the computer device, an evaluation result by comparing the predictive content or the declarative content with determined information comprises:

ranking credibility and completeness of the determined information;

matching the determined information to the predictive content or the declarative content based on the ranking; and comparing matched determined information to the predictive content or the declarative content to derive the correctness of the predictive content or the declarative content.

16. The system of claim 12, wherein the generating, by the computer device, a user behavior of each of the plurality of users by processing the information based on semantic recognition by using the knowledge graph comprises:

generating standard information based on the information; and generating the user behavior based on the standard information and the knowledge graph.

17. The system of claim 16, wherein the generating, by the computer device, the user behavior based on the standard information and the knowledge graph comprises:

splitting the standard information into one or more semantic fields;

mapping the one or more semantic fields into the knowledge graph, the knowledge graph recognizing the one or more semantic fields based on an association among the one or more semantic fields; and generating the user behavior based on a recognized result that is generated by the knowledge graph matched with the one or more semantic fields.

18. The system of claim 17, further comprising:
searching for another user with a similar user behavior based on the user behavior of the each of the plurality of users.

19. The system of claim 18, wherein the searching, by the computer device, for another user with a similar user behavior based on the user behavior of the each of the plurality of users comprises:

clustering the one or more semantic fields mapped into the knowledge graph, the knowledge graph constructing, based on the clustered one or more semantic fields, associations among the one or more semantic fields in one or more clusters;

mapping, based on the knowledge graph, the plurality of users onto at least one of the one or more semantic fields, the at least one semantic field corresponding to the user behavior of the each of the plurality of users;

determining, based on the clustered one or more semantic fields and the at least one semantic field, a cluster that the each of the plurality of users belongs to; and constructing, based on the clustered one or more semantic fields and the knowledge graph, associations between the plurality of users and the another user, the another user being of a same type or a different type with the plurality of users, which is mapped onto the one or more semantic fields.

20. A non-transitory computer readable medium, comprising executable instructions that, when executed by at least one processor, direct the at least one processor to perform a method for semantic analysis in finance, the method comprising:

constructing, by the computer device, a knowledge graph;

acquiring, by the computer device, information published by a plurality of users on a social network through a network;

generating, by the computer device, a user behavior of each of the plurality of users by processing the information based on semantic recognition by using the knowledge graph;

determining, by the computer device, a user rating of the each of the plurality of users based on correctness of the information by processing the information based on the semantic recognition;

dividing, by the computer device, the plurality of users into at least one category based on the user behavior of the each of the plurality of users by mapping the plurality of users onto a plurality of semantic vectors mapped into the knowledge graph, wherein the plurality of semantic vectors are constructed based on the processed information, and users of a same category have similar user behavior; and generating, by the computer device, a relationship between user behaviors and user ratings based on the at least one category of the plurality of users.

* * * * *